United States Patent
Fujikake et al.

(10) Patent No.: US 8,842,981 B2
(45) Date of Patent: Sep. 23, 2014

(54) ADAPTER FOR HOLDING A CAMERA-BEARING DEVICE TO AN OPTICAL INSTRUMENT

(71) Applicant: HI Resolution Enterprises, LLC, Honolulu, HI (US)

(72) Inventors: Daniel N. Fujikake, Honolulu, HI (US); Mac Nguyen, Honolulu, HI (US)

(73) Assignee: HI Resolution Enterprises, LLC, Honolulu, HI (US)

( * ) Notice: Subject to any disclaimer, the term of this patent is extended or adjusted under 35 U.S.C. 154(b) by 0 days.

(21) Appl. No.: 13/792,649

(22) Filed: Mar. 11, 2013

(65) Prior Publication Data
US 2014/0226965 A1   Aug. 14, 2014

Related U.S. Application Data (60) Provisional application No. 61/762,365, filed on Feb. 8, 2013.

(51) Int. Cl.
*G03B 17/48*   (2006.01)
*G03B 17/56*   (2006.01)

(52) U.S. Cl.
CPC ..................... *G03B 17/565* (2013.01)
USPC ....................................................... 396/432

(58) Field of Classification Search
CPC ..... G03B 17/48; G03B 17/561; G02B 21/362
USPC .......................................... 396/419, 428, 544
See application file for complete search history.

(56) References Cited

U.S. PATENT DOCUMENTS

| | | | |
|---|---|---|---|
| 2,967,456 A * | 1/1961 | Maier | 396/326 |
| 2,990,759 A * | 7/1961 | Marcosky | 396/324 |
| 4,021,825 A * | 5/1977 | McCann et al. | 396/432 |
| 6,889,006 B2 | 5/2005 | Kobayashi | |
| 6,967,790 B2 | 11/2005 | Wei | |
| 7,870,688 B1 | 1/2011 | Dasiukevich | |
| 7,976,227 B2 | 7/2011 | Orf | |
| 8,073,324 B2 | 12/2011 | Tsai | |
| 8,210,757 B2 | 7/2012 | Sterns | |
| 2002/0197075 A1 | 12/2002 | Crockett | |
| 2007/0109635 A1 | 5/2007 | Albrecht | |
| 2009/0040600 A1 | 2/2009 | Vojtech | |

(Continued)

OTHER PUBLICATIONS

Magnifi Photoadapter, Kickstarter Project, Apr. 5, 2012, http://www.kickstarter.com/projects/637232010/magnifi-the-worlds-first-iphone-photoadapter-case.

(Continued)

*Primary Examiner* — WB Perkey
(74) *Attorney, Agent, or Firm* — Leighton K. Chong (57) ABSTRACT

An adapter for holding a camera lens of a smartphone, digital mobile device or other camera-bearing device in alignment with an optical instrument has an optical instrument coupler with a pair of spaced-apart clamp members, one of which is used to clamp onto an eyepiece of the optical instrument, and a camera-bearing device coupler having a device clamp member which is used to clamp the camera-bearing device so that its camera lens is in optical alignment with the clamped eyepiece of the optical instrument. A mounting plate with a camera lens slot and a linearly movable locking bracket for the optical instrument coupler enables the position of the camera lens to be adjusted in alignment with the eyepiece of the optical instrument.

9 Claims, 12 Drawing Sheets

(56) References Cited

U.S. PATENT DOCUMENTS

| | | |
|---|---|---|
| 2010/0182475 A1 | 7/2010 | Witte |
| 2011/0064401 A1* | 3/2011 | Desorbo ............... 396/419 |
| 2011/0069947 A1* | 3/2011 | Orf ....................... 396/419 |
| 2012/0195585 A1* | 8/2012 | Wagner ................. 396/428 |
| 2013/0016963 A1* | 1/2013 | Miller ................... 396/428 |
| 2013/0100271 A1* | 4/2013 | Howes ..................... 348/78 |
| 2013/0111798 A2* | 5/2013 | Russell .................... 42/90 |
| 2013/0230309 A1* | 9/2013 | Porter et al. .......... 396/432 |
| 2013/0251358 A1* | 9/2013 | Kuehl et al. .......... 396/428 |

OTHER PUBLICATIONS

Orion SteadyPix Telescope Photo Adapter for iPhone, circa 2012, http://www.telescope.com/Astrophotography/Camera-Adapters-T-Rings/Orion-SteadyPix.

Orion SteadyPix Universal Smartphone Telescope Photo Adapter, circa 2012, http://www.telescope.com/Astrophotography/Camera-Adapters-T-Rings/Orion-SteadyPix.

Meopta MeoPix iScoping Adapter, Jun. 25, 2012, http://10000birds.com/using-the-meopta-meopic-iscoping-adapter.htm.

* cited by examiner

ADAPTER FOR HOLDING A CAMERA-BEARING DEVICE TO AN OPTICAL INSTRUMENT

This U.S. patent application claims the priority filing date of U.S. Provisional Application 61/762,365 filed on Feb. 8, 2013, by the same inventors in the present application.

TECHNICAL FIELD

The present invention relates to an adapter for connecting an optical instrument to the camera lens of a smartphone, digital mobile device, or other portable camera-bearing device so that digital photos or videos can be taken with a magnified or zoom view.

BACKGROUND ART

Smartphones and other digital mobile devices in current use have on-board cameras for enabling a user to take photographs or videos and send them in communications to others. Prior camera lens adapters or couplers typically are formed in the shape of a bracket or casing for holding the camera lens of a smartphone or other camera-bearing device to the eyepiece of an optical instrument. However, these prior adapters or couplers do not provide a convenient way to align the horizon for the camera-bearing device with the horizon of a subject to be photographed or videoed through the optical instrument. Consequently, a user must take time to view a subject image through the camera-bearing device while coupled to the optical instrument and manually adjust the orientation of the camera-bearing device with the optical instrument until the viewed image is aligned with the horizon of the camera.

SUMMARY OF INVENTION

In a preferred embodiment of the present invention, an adapter for holding a camera lens of a smartphone, digital mobile device or other camera-bearing device in alignment with an optical instrument comprises:

an optical instrument coupler having a pair of spaced-apart optical instrument clamp members, at least one of which is adapted to clamp an eyepiece of an optical instrument;

a camera-bearing device coupler having a device clamp member which is adapted to clamp a linear edge of a camera-bearing device;

a mounting plate for holding the optical instrument coupler in alignment with the camera-bearing device coupler so that a camera lens on the camera-bearing device is in optical alignment with the eyepiece of the optical instrument to be clamped by the optical instrument coupler, wherein the linear edge of the camera-bearing device to be clamped by said device clamp member is indicative of a horizon line of an image to be viewed through the camera lens of the camera-bearing device, and wherein said pair of spaced-apart optical instrument clamp members are aligned relative to said device clamp member so that the horizon line for the image to be viewed through said optical instrument is aligned with the camera lens of the camera-bearing device.

In the preferred embodiment, the pair of spaced-apart optical instrument clamp members is adapted to be clamped to a pair of eyepieces of a binocular instrument. By holding the binocular instrument in alignment with the horizon for the subject image to be photographed or videoed, the user is assured that the horizon for the image to be viewed through the camera lens is in alignment with the horizon for the subject image. Even though only one of the two eyepieces of the binocular instrument is optically coupled to the camera lens, the clamping of both eyepieces enables a much more secure attachment of the device to the binocular instrument. It also reduces the weight stress of clamping to only one eyepiece.

Preferably, the optical instrument coupler has a guide rail recess for holding a guide rail for the camera-bearing device coupler so that it can be linearly moved to adjust the relative positioning of the optical instrument coupler with the camera-bearing device coupler. The camera-bearing device coupler may have a mounting plate with a lens slot for accommodating different positions for the camera lenses of different types of smartphones, digital mobile devices or other camera-bearing devices.

The above-described adapter may also be used to couple a camera-bearing device to an optical instrument that has only a single eyepiece, such as a microscope or a telescope. The horizon line indicated by the pair of spaced-apart optical instrument clamp members may be used for alignment of the horizon line for the image to be viewed through the camera lens with a horizon line indicated for the one-eyepiece optical instrument. For example, a microscope or a telescope is typically oriented to an instrument horizon of a sample to be viewed through the instrument, so the horizon line indicated by the pair of spaced-apart clamp members can be conveniently aligned with the instrument horizon.

Other objects, features, and advantages of the present invention will be explained in the following detailed description of preferred embodiments of the invention with reference to the appended drawings.

DESCRIPTION OF PREFERRED EMBODIMENTS

In the following detailed description of the invention, certain preferred embodiments are illustrated providing certain specific details of their implementation. However, it will be recognized by one skilled in the art that many other variations and modifications may be made given the disclosed principles of the invention.

Figure 1:
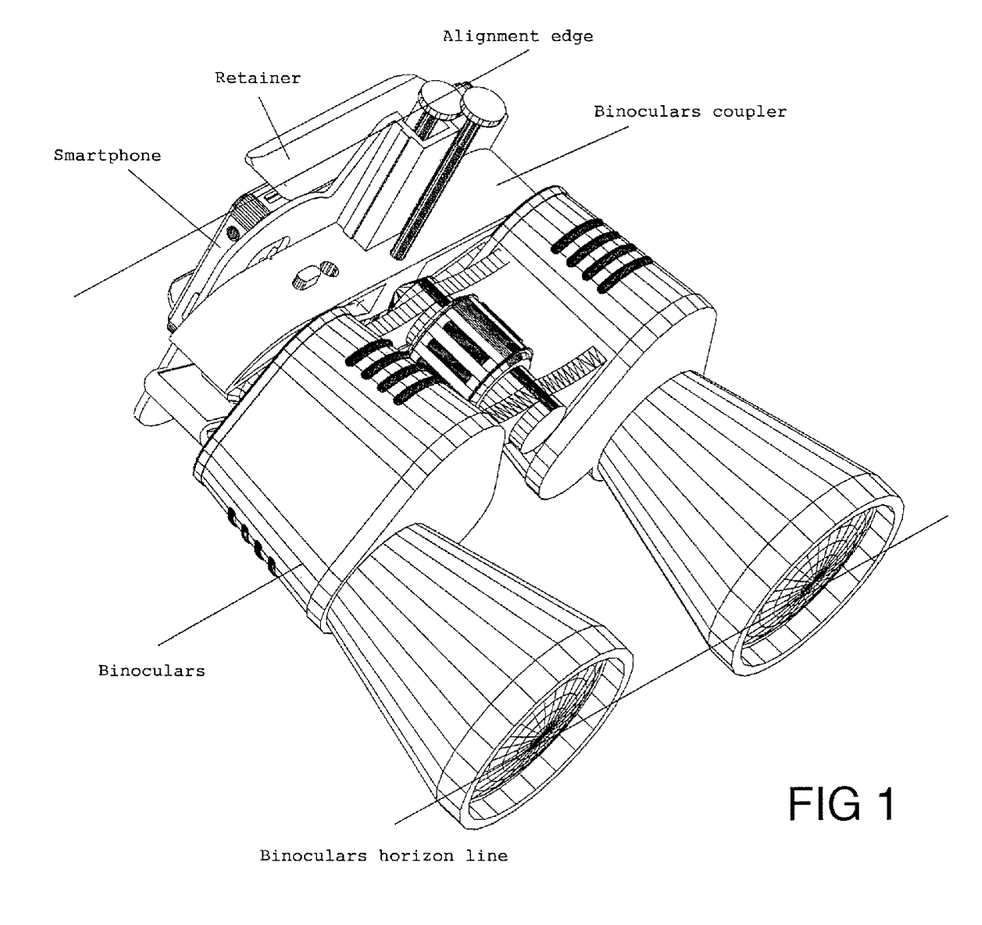
FIG. 1 illustrates an adapter for attaching a camera lens of a smartphone, digital mobile device or other camera-bearing device to an optical instrument in accordance with the present invention.

Referring to FIG. 1, a preferred embodiment of an adapter for holding a camera-bearing device to an optical instrument in accordance with the present invention is illustrated by the example of a binoculars coupler for coupling binoculars to a smartphone (or other camera-bearing device). The binoculars have a pair of eyepieces that are mechanically aligned in parallel with its two binocular lenses. The binoculars are typically held with the two binoculars lenses in alignment with the horizon line of a subject image to be viewed. The binoculars coupler has two eyepiece clamps configured to be in predetermined alignment with a linear device edge of the smartphone that indicates a horizon line for the smartphone camera when held in landscape mode. The linear device edge of the smartphone can also indicate a vertical line for the smartphone camera in portrait mode. In use, the user only needs to hold the binoculars aligned with the horizon of the subject image in order to ensure that it is aligned with the horizon line of the smartphone camera.

The described adapter can be used to connect the camera on any smartphone, digital mobile device, or other camera-bearing device with an optical instrument. In the preferred embodiment the adapter is used to couple to an optical instrument that has paired eyepieces, such as binoculars. It may also be used to couple a camera-bearing device to an optical instrument that has only a single eyepiece, such as a microscope or a telescope. The alignment of the pair of spaced-apart clamp members with a linear edge of the camera-bearing device is used to ensure alignment of the optical instrument for an image to be viewed through the camera. For a single-eyepiece instrument such as a microscope or a telescope that is typically oriented in use to an instrument horizon for an image to be viewed through the instrument, the pair of spaced-apart clamp members can be conveniently aligned with the instrument horizon, thereby ensuring that the horizon line for an image to be viewed through the camera is aligned with the instrument horizon. The camera-bearing device can thus capture photo images and videos in proper alignment through the optical instrument providing magnification or zoom viewing of the subject.

Figure 2A:
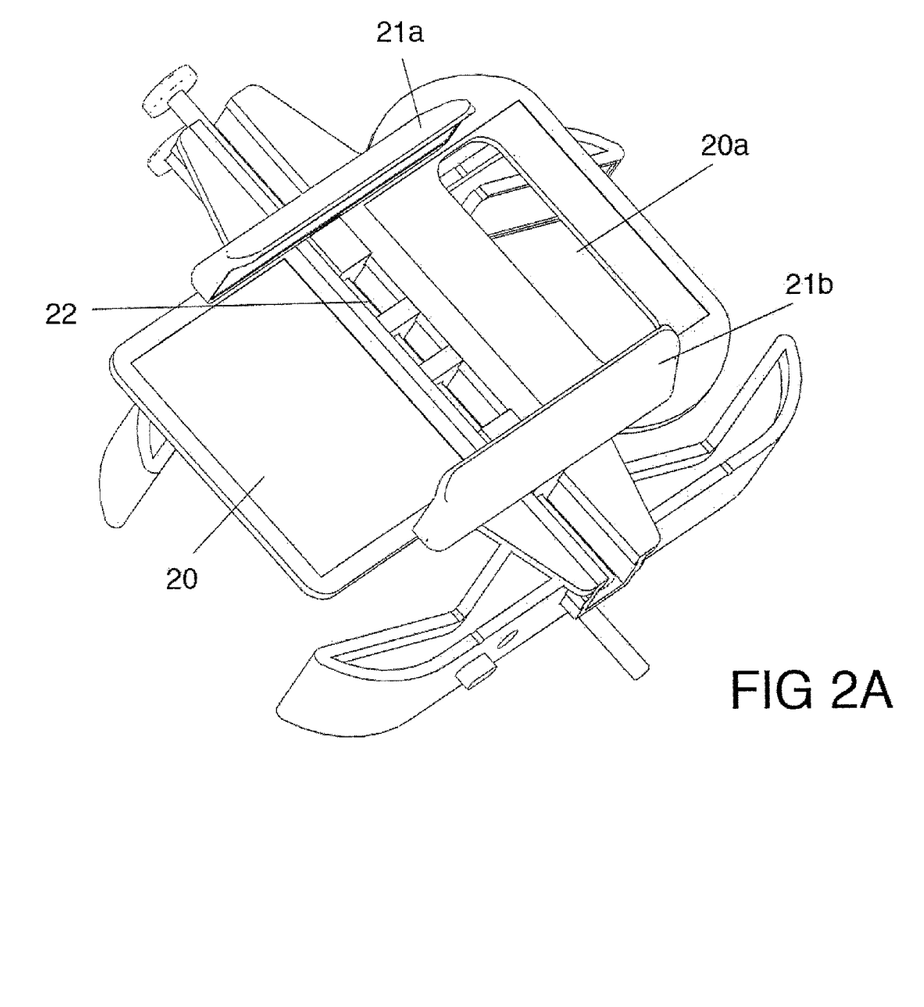
FIG. 2A is a front view of the adapter showing the camera-bearing device coupler side.

In FIG. 2A, a front view of a preferred embodiment of the adapter shows a camera-bearing device coupler side having a mounting plate 20 with a camera lens slot 20a, pair of device retainer clamp jaws 21a, 21b for clamping a camera-bearing device, and interior guide slot 22 for guiding movement of the device retainer clamp jaws together to clamp the camera-bearing device in between.

Figure 2B:
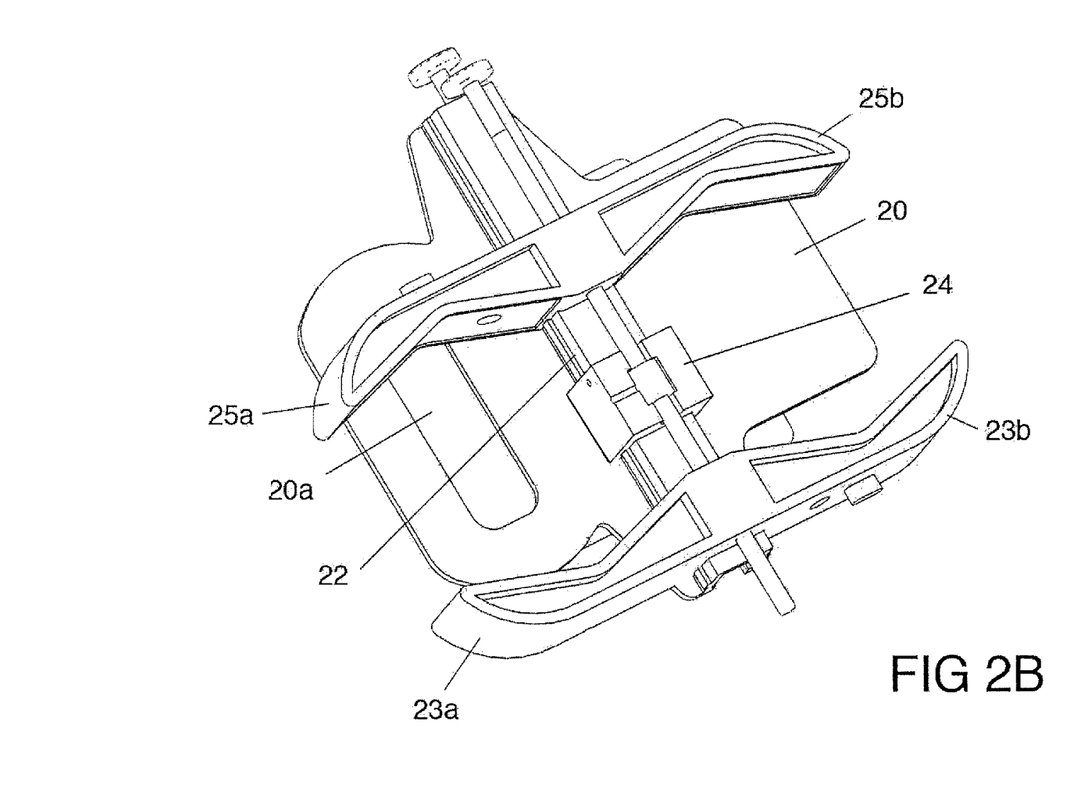
FIG. 2B is a back view of the adapter showing the optical instrument coupler side.

In FIG. 2B, a back view of the preferred embodiment of the adapter shows the optical instrument coupler side having a pair of eyepiece clamp jaws 23a, 25a and 23b, 25b for clamping the eyepiece(s) of an optical instrument in between, a locking bracket 24 for locking the eyepiece clamp jaws in a fixed position on an exterior side of the guide slot 22 relative to the device retainer clamp jaws for the camera-bearing device so that the camera lens is in optical alignment with one eyepiece of the optical instrument through the camera lens slot 20a.

Figure 3:
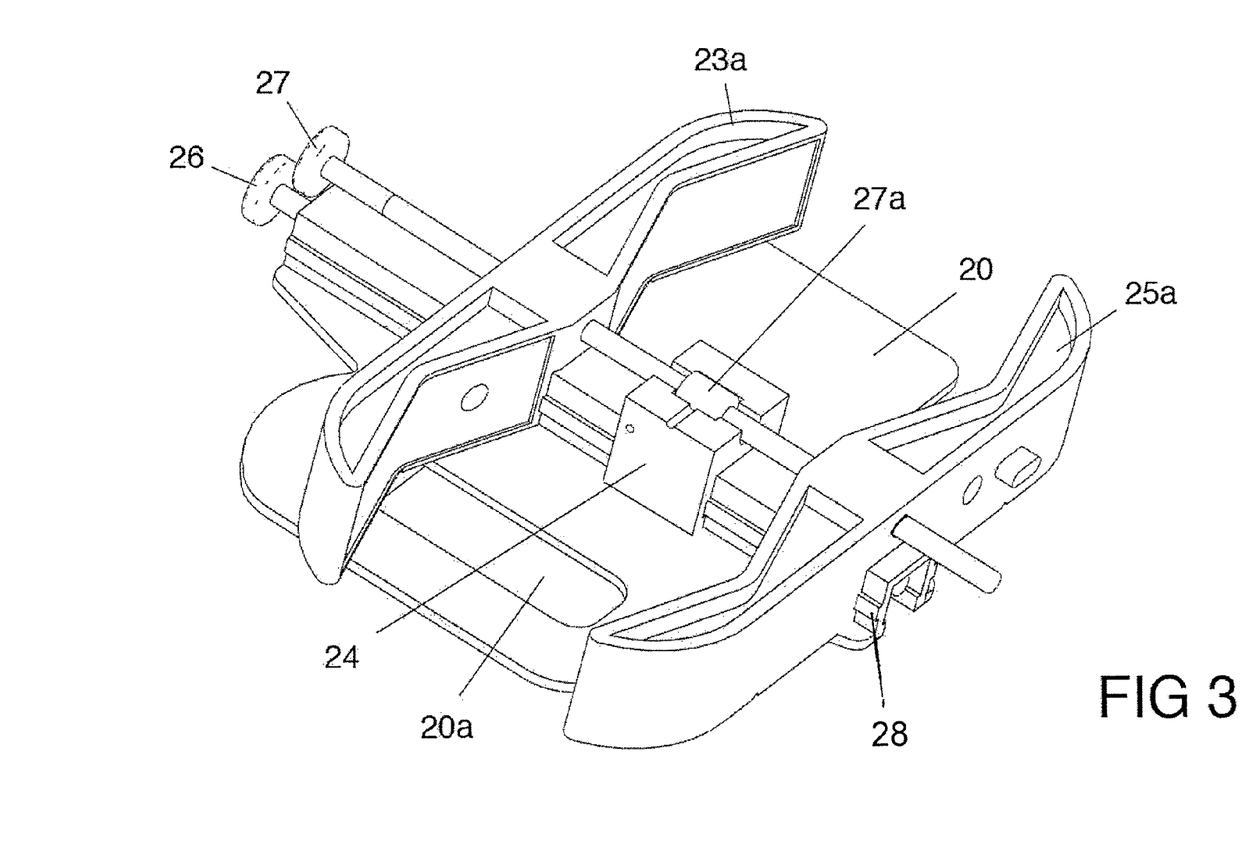
FIG. 3 is an internal view of the adapter showing a locking bracket for holding the spindle for the clamp members of the optical instrument coupler in alignment with the camera-bearing device coupler for the camera-bearing device.

FIG. 3 is an internal view of the adapter showing a locking bracket for holding the spindle for the clamp members of the optical instrument coupler in alignment with the camera-bearing device coupler for the camera-bearing device. The optical instrument clamping system consists of the two self-centering clamp jaws 23, 25 for the eyepiece(s) of the optical instrument. The camera-bearing device clamping system consists of the camera-bearing device clamp jaws 21a, 21b. The clamp members clamp and position the camera-bearing device so that its camera lens is in alignment with the eyepiece(s) of the optical instrument. The optical instrument clamping system has a lead spindle 27 and the camera-bearing device clamping system has a lead spindle 26 to move the clamp members together or apart when their respective spindle heads are rotated. The lead spindle 27 of the optical instrument clamping system has a shaft coupler 27a that is held in a locking bracket 24 that is keyed for adjustment movement on an exterior guide rail 28 to position the eyepiece of the optical instrument relative to the camera lens slot 20a.

Figure 4:
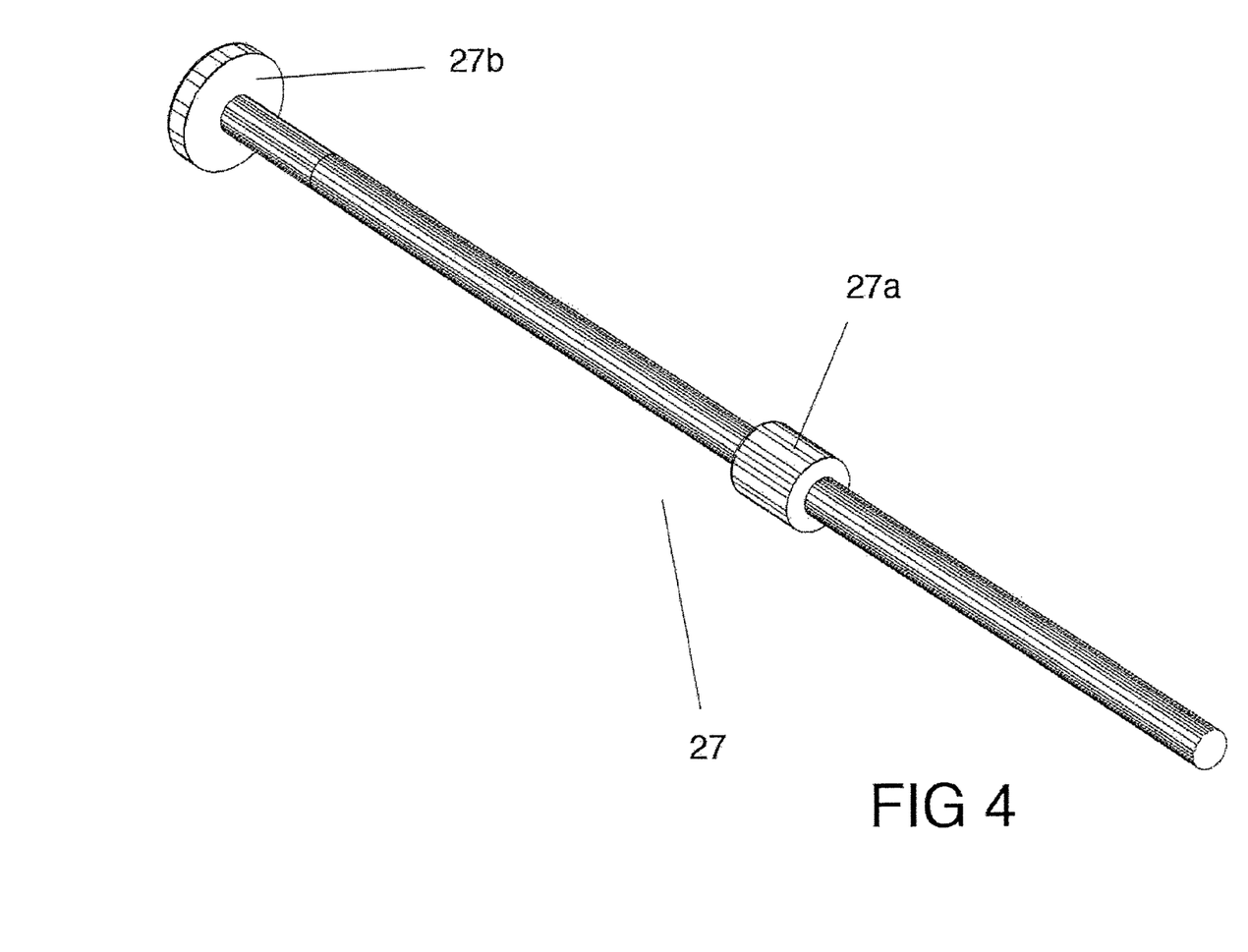
FIG. 4 is a detailed view of the spindle and threaded bolt for clamping the camera-bearing device coupler.

FIG. 4 is a detailed view of the lead spindle 27 for clamping the clamp members of the optical instrument coupler. The lead spindle 27 has oppositely threaded (right-hand and left-hand) halves to move the clamp's jaws on opposite sides of the shaft coupler 27a which is maintained in a fixed position by the locking bracket 24 (see FIG. 3). As the lead spindle head 27b is rotated, the clamp jaws which are threaded to the opposite sides of the shaft coupler 27a move uniformly apart or together in opposite directions, either opening the clamp jaws apart or together.

Figure 5:
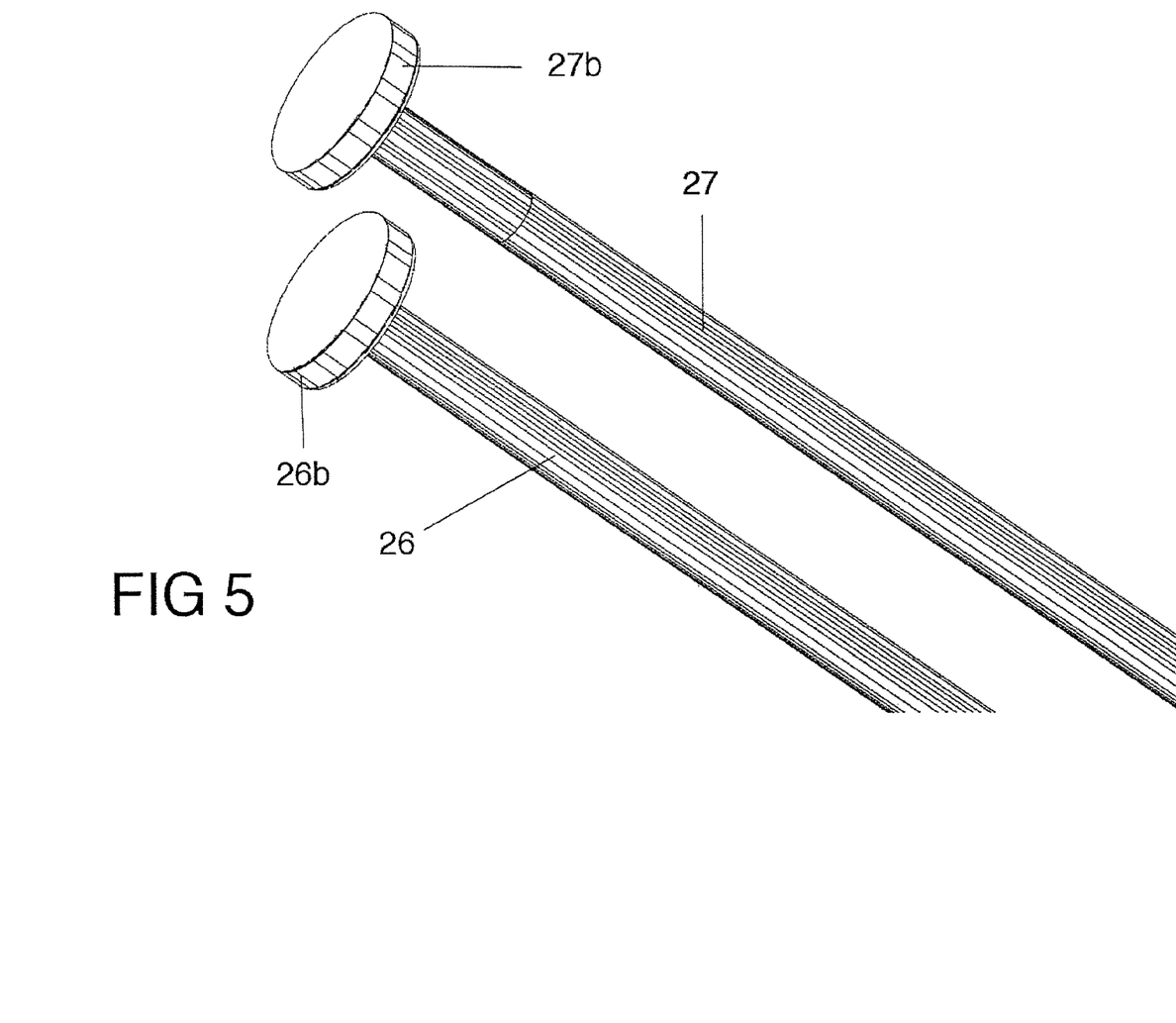
FIG. 5 is a detailed view of the lead screws and spindle heads for adjusting the clamping members of the camera-bearing device coupler and the optical instrument coupler.

FIG. 5 is a detailed view of the lead spindles 26, 27 and respective spindle heads 26a, 27a for adjusting the clamp members of the camera-bearing device coupler and the optical instrument coupler, respectively. The spindle heads may be in the form of gripped knobs attached at the top of the lead spindles.

Figure 6:
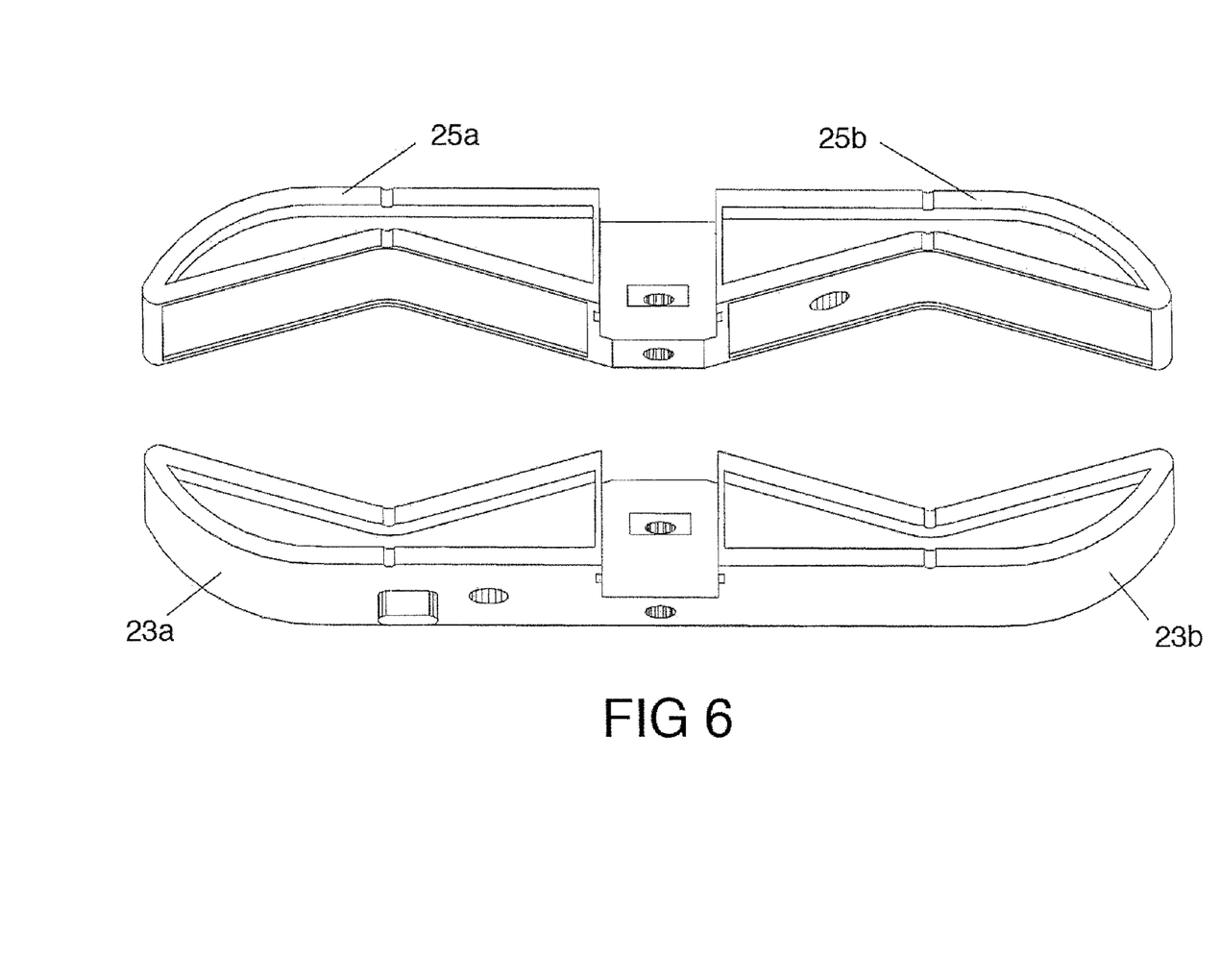
FIG. 6 is a detailed view of the pair of clamp members for the optical instrument coupler.

FIG. 6 is a detailed view of the pair of clamp members 23a, 25a and 23b, 25b for the optical instrument coupler. The jaws of the optical instrument clamp members are preferably designed for use with the two eyepieces of binoculars, but may be used equally well with optical instruments having single eyepieces. For typical binocular dimensions, they may be designed to accommodate eyecups with an outside diameter of 25 mm to 50 mm, and fit over each eyepiece to a depth of 20 mm. Each set of clamp jaws has a V-shape for self-centering. The centers of the V shapes may be designed to accommodate a typical spread of binocular eyepieces, such as 72 mm apart. Binoculars typically have a center pivot to adjust the spread of the binocular eyepieces. Between each set of clamp jaws runs a guide rail recess for the lead spindle (see lead spindle 27 above). An accessory attachment point may be provided at an outer edge of the clamping system, which may be used to mount a counter weight or couple the adapter to other accessories.

Figure 7:
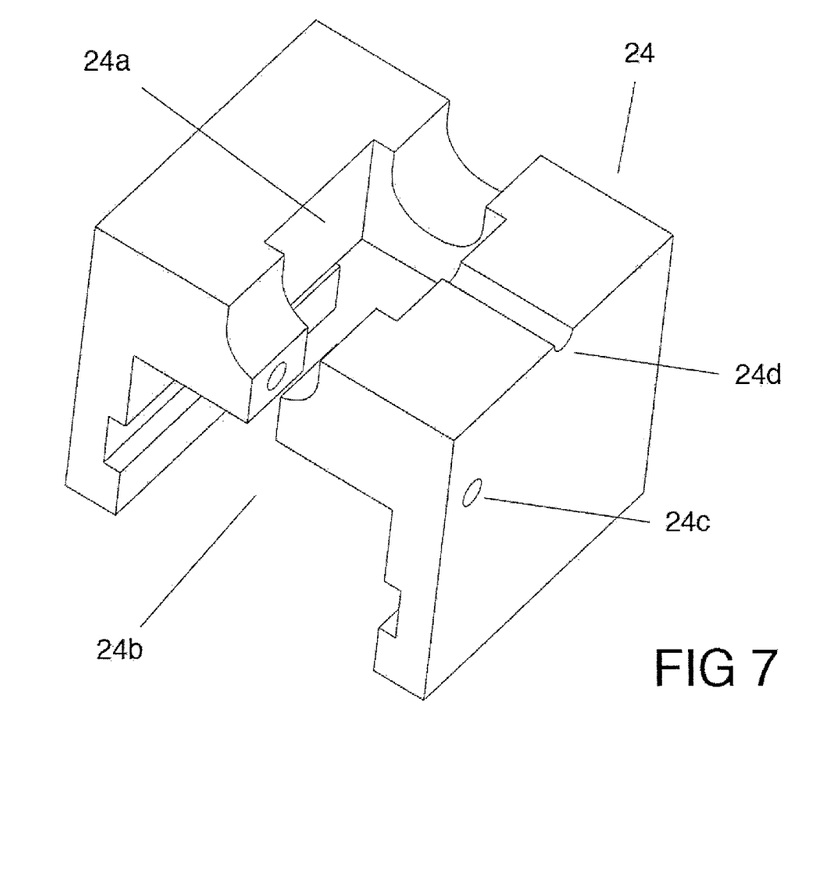
FIG. 7 is a detailed view of the locking bracket connecting the camera-bearing device coupler to the optical instrument coupler.

FIG. 7 is a detailed view of the locking bracket 24 for coupling the camera-bearing device coupler to the optical instrument coupler in a fixed sliding relationship. The locking bracket 24 enables the optical instrument coupler to change its alignment position relative to the camera-bearing device coupler so that the camera lens can be optically aligned with the selected eyepiece of the optical instrument. A slot 24a is used to constrain the shaft coupler 27a of the lead screw 27 in a fixed position. A guide rail recess 24b accommodates the keyed exterior guide rail 28 (see FIG. 3) fixed to the mounting plate 20 for the camera-bearing device coupler. A locking screw is provided through hole 24c to lock the locking bracket 24 in a desired position on the exterior guide rail. A camera alignment sight mark 24d may be provided to align the position of the camera-bearing device with the position of the selected eyepiece of the optical instrument. The ability to adjust the relative alignment positions of the camera-bearing device with the optical instrument provides the adapter with universal compatibility for accommodating different camera-bearing devices.

Figure 8:
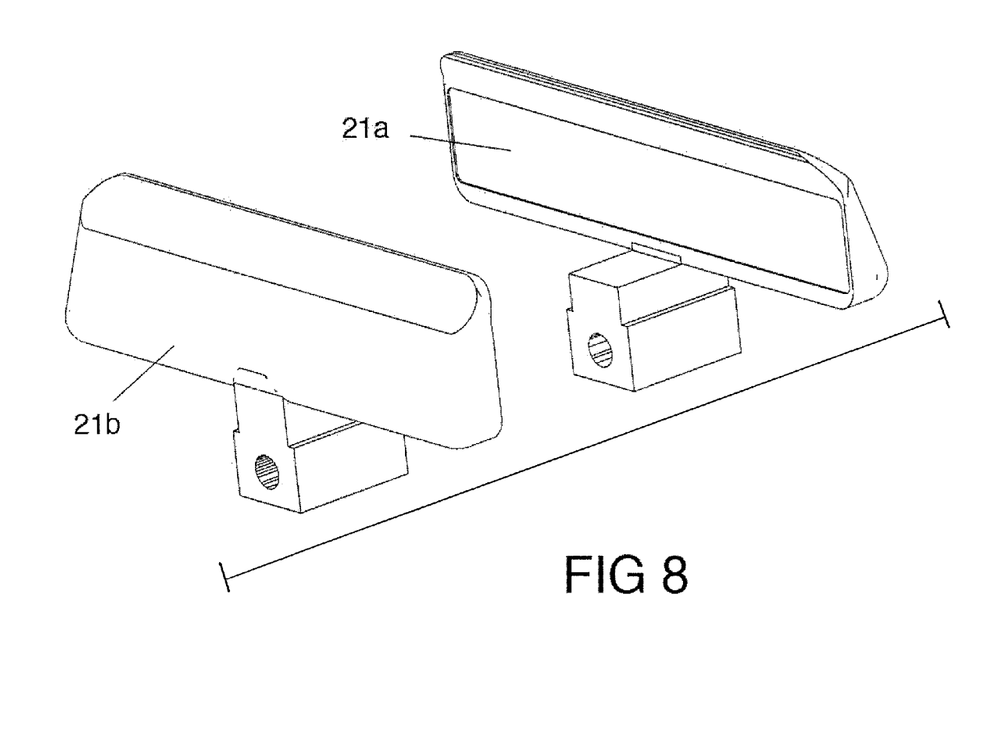
FIG. 8 is a detailed view of the clamp member for the camera-bearing device coupler.

FIG. 8 is a detailed view of the clamp jaws 21a, 21b for the camera-bearing device coupler. The clamp's jaws are designed to universally accommodate any type of camera-bearing device, with or without protective case. For example, they may be dimensioned to accommodate a device depth up to about 20 mm, and a device width up to about 85 mm. Each jaw has a keyed clamp base which is movable along the interior of the guide rail 28 (see FIG. 3) fixed to the mounting plate 20 for the camera-bearing device. The jaws are configured to hold the camera-bearing device securely, and may be padded to protect the camera-bearing device from scratching.

Figure 9:
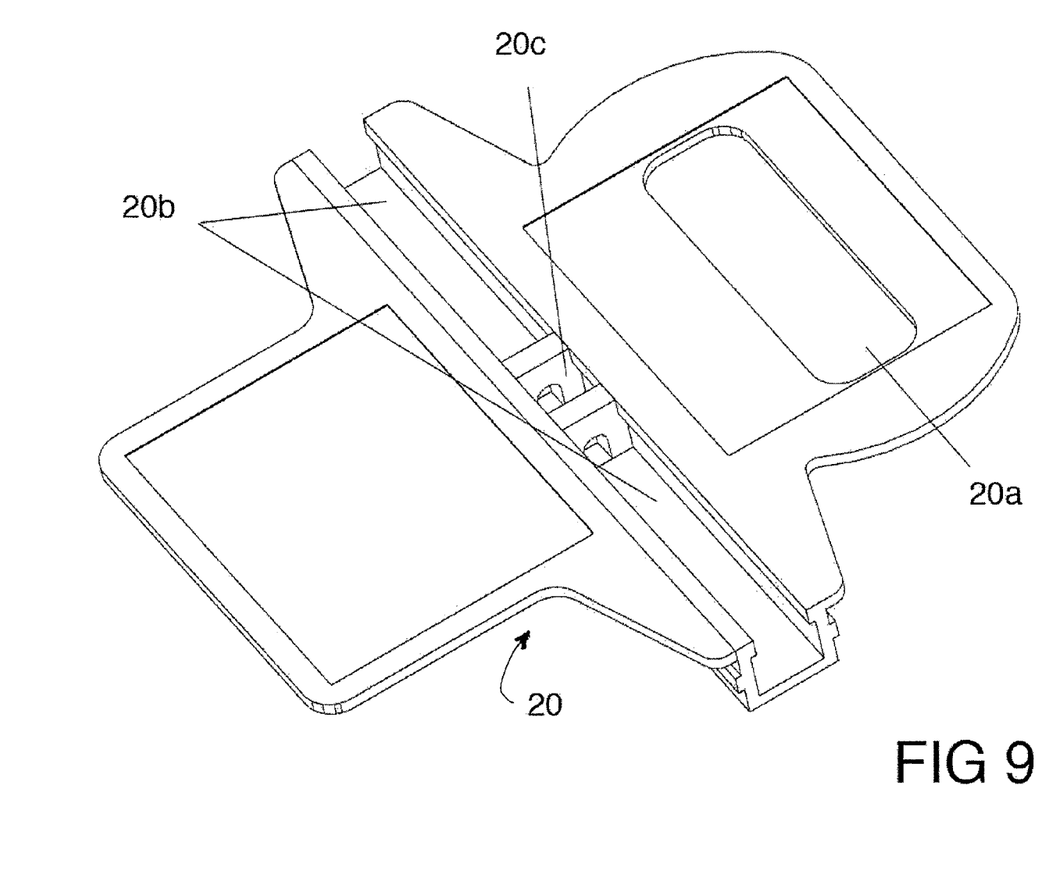
FIG. 9 is a detailed view of the mounting plate for the camera-bearing device coupler.

FIG. 9 is a detailed view showing the mounting plate 20 having camera lens slot 20a, and interior channel 20b and retainer brackets 20c for the lead spindle 26 (see FIG. 3) for moving the clamp jaws of the camera-bearing device coupler.

Figure 10:
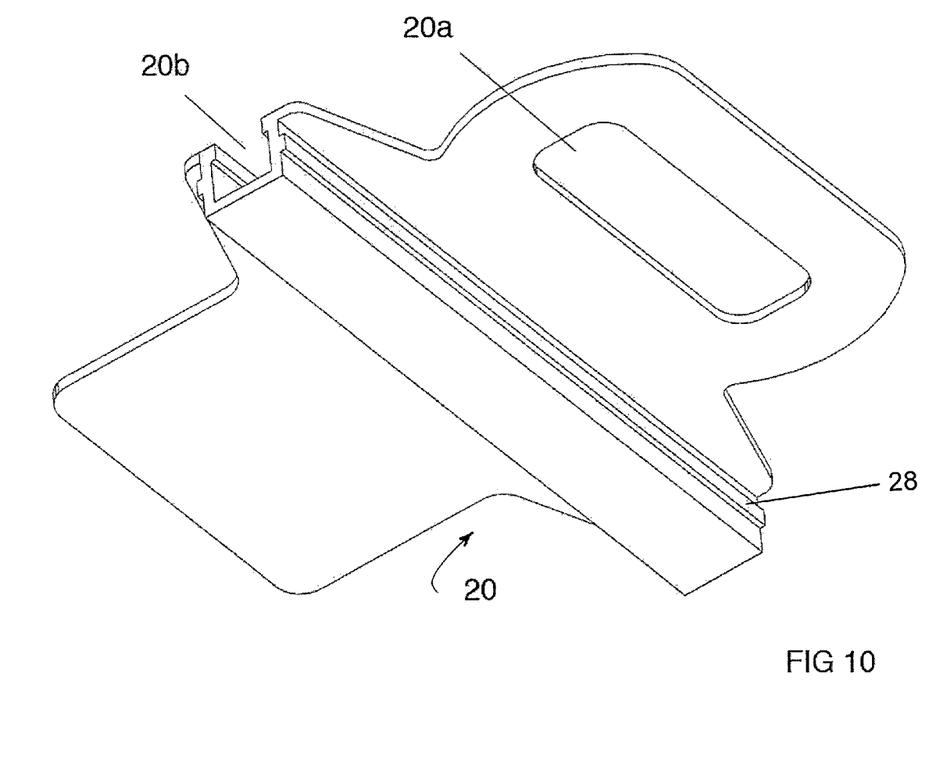
FIG. 10 is a detailed view of the underside of the mounting plate for the camera-bearing device coupler showing the interior and exterior guide rails.

FIG. 10 is a detailed view of the underside of the mounting plate showing the camera lens slot 20a, interior channel 20b, and exterior guide rail 28.

Figure 11:
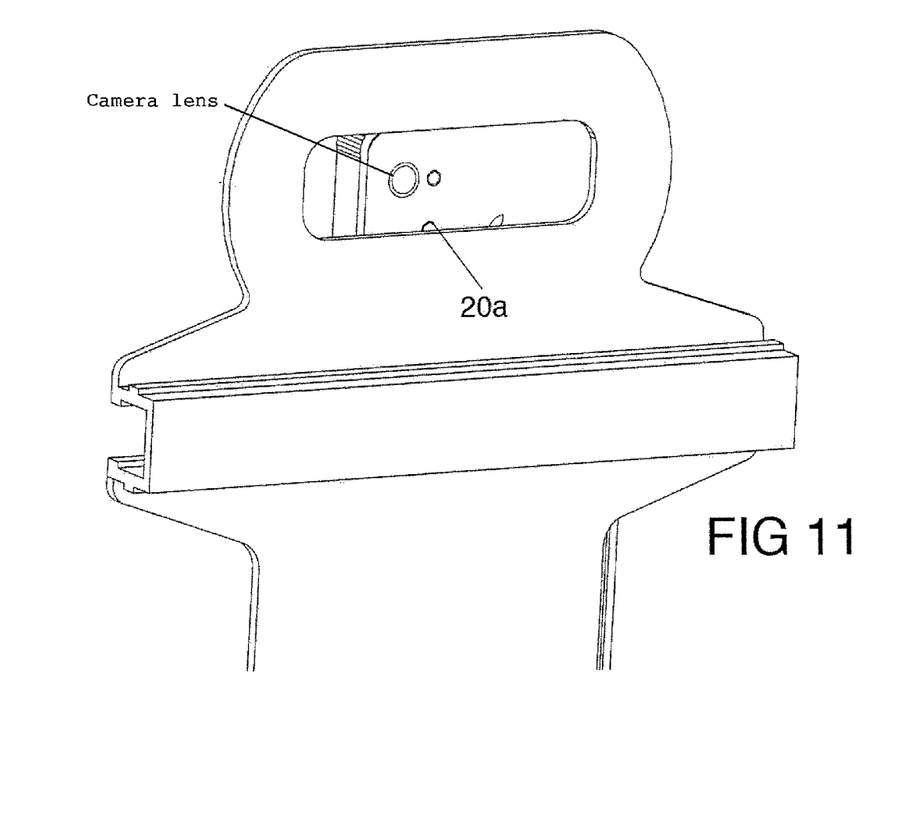
FIG. 11 is a detailed view of the lens slot in the mounting plate for the camera-bearing device coupler.

FIG. 11 is a detailed view of the camera lens slot 20a in the mounting plate 20. The mounting plate 20 connects and aligns the camera-bearing device clamping system in alignment with the camera lens slot 20a for the camera lens. The mounting surface of the mounting plate 20 may be covered with an anti-skid material, which helps prevent the camera-bearing device from slipping off the plate during fastening. The camera lens slot 20a is an aperture in the mounting plate through which the camera lens can be optically aligned with the eyepiece of the optical instrument. The area surrounding the slot 20a acts to seal the eyepiece from errant light that could disrupt the image.

A safety leash may be provided to keep the adapter attached to the eyepiece of the optical instrument. A counter weight may also be provided to balance the offset weight distribution of the adapter (with an attached camera-bearing device), when used on a single eyepiece instrument. The counter weight can prevent the adapter from torquing and interfering with eyepiece zoom ring settings or twist-out eyecup depth, and helps the adapter to maintain a level horizontal shooting position.

To use the adapter, a user opens the clamp jaws of the camera-bearing device coupler enough to accommodate the camera-bearing device by rotating the lead spindle head. The camera-bearing device is placed on the mounting plate between the clamping jaws, and the jaws are tightened on the camera-bearing device by turning the spindle head to tighten. As the clamping jaws close, they will position the camera in alignment with the y-axis of an x-y plane. The clamping jaws should be tight enough to hold the camera-bearing device to the mounting plate, yet allow it to slide within the jaws. The camera-bearing device may be adjusted in position until its lens is centered in alignment with the camera lens slot, then the jaws are tightened until firmly locked in place.

For adjustment of alignment with the eyepiece of the optical instrument, the locking bracket may be accessed in the opening between clamp jaws, and the locking screw may be released to allow the locking bracket to be adjusted in position until the top edge of the locking bracket is just below the camera lens of the camera-bearing device. The bracket may also be aligned by using the centering mark to align with the center of the camera lens. The locking screw may then be tightened to lock the locking bracket in place. The spindle head for the clamp jaws may be opened a little wider than the eyecup(s) of the optical instrument. The spread of paired eyepieces may be adjusted so that the eyecups are centered in the V's of the clamp jaws. The clamp jaws are then tightened onto the eyecups by rotating the spindle head. As the clamp jaws close, the self-centering V-shape will position the optical axis of one eyepiece of the optical instrument into coaxial alignment with the camera lens through the camera lens slot. The user may preview an image and focus the camera lens of the camera-bearing device on a subject before shooting a photograph or video.

To mount the adapter to a single-eyepiece scope, the pair of eyepiece clamps is aligned with the horizon line for the optical instrument, and the clamp jaws on one side are tightened on the single eyepiece. A counter weight accessory may be used to prevent an unbalanced adapter from torquing the eyepiece, interfering with eyepiece zoom ring settings and/or changing twist-out eyecup depths. For best results with high power scopes, a tripod or setup on a stable surface may be used.

The adapter as described above enables the horizon line for an image to be viewed through the device camera to be conveniently aligned with the horizon line indicated for the optical instrument. In the preferred embodiment, the camera-bearing device coupler clamps on the pair of eyepieces of a binoculars instrument which indicates a horizon line for viewing. The adapter may similarly be used on single-eyepiece instruments by aligning the pair of optical instrument coupler with a horizon line indicated for the instrument and clamping the single eyepiece. The preferred adapter structure provides universal compatibility with different types of smartphones, digital mobile devices, and other camera-bearing devices. When mounted on a dual-eyepiece scope, the adapter's attachment is especially strong and stable. A counter weight accessory may be used to offset weight imbalance when used on single-eyepiece scopes.

It is to be understood that many modifications and variations may be devised given the above description of the general principles of the invention. It is intended that all such modifications and variations be considered as within the spirit and scope of this invention, as defined in the following claims.

The invention claimed is:

1. An adapter for holding a camera lens of a smartphone, digital mobile device or other camera-bearing device in alignment with an optical instrument comprising:
    an optical instrument coupler having a pair of spaced-apart optical instrument clamp members, at least one of which is adapted to clamp an eyepiece of an optical instrument;
    a camera-bearing device coupler having a device clamp member which is adapted to clamp a linear edge of a camera-bearing device;
    a mounting plate for holding the optical instrument coupler in alignment with the camera-bearing device coupler so that a camera lens on the camera-bearing device is in optical alignment with the eyepiece of the optical instrument to be clamped by the optical instrument coupler,
    wherein the linear edge of the camera-bearing device to be clamped by said device clamp member is indicative of a horizon line of an image to be viewed through the camera lens of the camera-bearing device,
    wherein said pair of spaced-apart optical instrument clamp members are aligned relative to said device clamp member so that the horizon line for the image to be viewed through said optical instrument is aligned with the camera lens of the camera-bearing device, and
    wherein said pair of spaced-apart optical instrument clamp members is adapted to be clamped onto a pair of eyepieces of a binocular instrument.

2. An adapter according to claim 1, wherein the camera-bearing device is a smartphone.

3. An adapter according to claim 1, wherein the camera-bearing device is a digital mobile device.

4. An adapter for holding a camera lens of a smartphone, digital mobile device or other camera-bearing device in alignment with an optical instrument comprising:
- an optical instrument coupler having a pair of spaced-apart optical instrument clamp members, at least one of which is adapted to clamp an eyepiece of an optical instrument;
- a camera-bearing device coupler having a device clamp member which is adapted to clamp a linear edge of a camera-bearing device;
- a mounting plate for holding the optical instrument coupler in alignment with the camera-bearing device coupler so that a camera lens on the camera-bearing device is in optical alignment with the eyepiece of the optical instrument to be clamped by the optical instrument coupler,
- wherein the linear edge of the camera-bearing device to be clamped by said device clamp member is indicative of a horizon line of an image to be viewed through the camera lens of the camera-bearing device,
- wherein said pair of spaced-apart optical instrument clamp members are aligned relative to said device clamp member so that the horizon line for the image to be viewed through said optical instrument is aligned with the camera lens of the camera-bearing device, and
- wherein said optical instrument coupler has a lead spindle and shaft coupler held in a locking bracket movable on a guide rail provided on the mounting plate to adjust the relative positioning of the optical instrument coupler with the camera-bearing device coupler.

5. An adapter according to claim 4, wherein one of said pair of spaced-apart optical instrument clamp members is adapted to be clamped onto an eyepiece of a single-eyepiece optical instrument.

6. An adapter according to claim 4, wherein the camera-bearing device coupler has a lead spindle held in an interior channel of the mounting plate to adjust the device clamp member to clamp a linear edge of the camera-bearing device.

7. An adapter according to claim 4, wherein said the mounting plate of the camera-bearing device coupler has a camera lens slot for accommodating different positions of camera lenses on different types of camera-bearing devices.

8. An adapter according to claim 7, wherein the optical instrument is binoculars having a pair of spaced-apart eyepieces, one eyepiece of which is clamped by the optical instrument coupler so that it is in alignment with the camera lens slot in the mounting plate of the camera-bearing device coupler.

9. An adapter according to claim 7, wherein the optical instrument has a single eyepiece, such as for a microscope or telescope, which is clamped by the optical instrument coupler so that it is in alignment with the camera lens slot in the mounting plate of the camera-bearing device coupler.

* * * * *